United States Patent [19]

Cipolli et al.

[11] Patent Number: 5,225,463
[45] Date of Patent: Jul. 6, 1993

[54] SELF-EXTINGUISHING POLYMERIC COMPOSITIONS

[75] Inventors: Roberto Cipolli, Novara; Roberto Oriani, Milan; Gilberto Nucida, Milan; Mario Pirozzi, Milan; Enrico Masarati, Piacenza, all of Italy

[73] Assignee: Ministero dell'Universita e della Ricerca Scientifica e Tecnologica, Rome, Italy

[21] Appl. No.: 683,424

[22] Filed: Apr. 11, 1991

[30] Foreign Application Priority Data

Apr. 11, 1990 [IT] Italy .................. 20008 A/90

[51] Int. Cl.$^5$ ................ C08K 5/3435; C08K 5/3492; C08K 5/51; C08K 5/52
[52] U.S. Cl. ..................... 524/97; 524/100; 524/139; 524/140; 524/151; 524/416
[58] Field of Search ............. 524/100, 128, 139, 87, 524/95, 96, 99, 97, 130, 151, 140, 416

[56] References Cited

U.S. PATENT DOCUMENTS

| | | | |
|---|---|---|---|
| 4,154,930 | 5/1979 | Halpern | 524/100 |
| 4,162,276 | 1/1979 | Rim et al. | 524/100 |
| 4,241,145 | 12/1980 | Shukla | 524/100 |
| 4,670,483 | 6/1987 | Hall et al. | 524/100 |
| 4,812,499 | 5/1989 | Cipriani et al. | 524/139 |
| 4,879,327 | 11/1989 | Poisson et al. | 524/139 |
| 5,124,379 | 6/1992 | Cipolli et al. | 524/100 |

FOREIGN PATENT DOCUMENTS 0326082 8/1989 European Pat. Off. .
1106643 5/1986 Japan .
2097556 4/1990 Japan .

OTHER PUBLICATIONS

Hodgins, et al "Melamine-Formaldehyde Film-Forming Compositions" *Industrial Engineering Chemists* vol. 33, No. 6, 1941, pp. 769-779.
Smolin & Rapoport, *s-Triazine and Derivatives* (New York Interscience Publishing Inc.) 1959, pp. 338-343.
Dixon, Woodbery and Costa, "The Dissociation Constant of Melamine and Certain of its compounds", *Journal of the American Chemical Society* vol. 69, No. 1 Jan. 28, 1947, pp. 599-603.
"Amino Resins" in *Encyclopedia of Polymer Science and Engineering* (II Ed.) vol. 1, pp. 759-763.

*Primary Examiner*—Paul R. Michl
*Assistant Examiner*—Tae H. Yoon
*Attorney, Agent, or Firm*—Stevens, Davis, Miller & Mosher

[57] ABSTRACT

Self-extinguishing polymeric compositions containing: a) from 90 to 40 parts by weight of a thermoplastic polymer, or a polymer having elastomeric properties and b) 10 to 60 parts by weight of one or more 2,4,6-triamino-1,3,5-triazine compounds salified with an oxygenated acid of phosphorus, wherein at least one of the triamino substituents of the triazine compound are substituted with at least one of the following radicals $$\text{---}(C_mH_{2m})\text{---}OR_8 \quad \text{or}$$

$$[C_pH_{2p}]\text{---}N\begin{matrix}R'\\R'\end{matrix}$$

wherein
m = an integer between 2 and 8;
p = an integer between 2 and 6;
$R_8$ = H; $C_1$-$C_8$ alkyl; $C_2$-$C_6$ alkenyl; $C_qH_{2q}OR_9$ wherein q is an integer between 1 and 4 and $R_9$ is hydrogen or $C_1$-$C_4$ alkyl; $C_6$-$C_{12}$ cycloalkyl or alkylcycloalkyl;
R' is H; $C_1$-$C_8$ alkyl; $C_2$-$C_6$ alkenyl; $C_6$-$C_{12}$ cycloalkyl or alkylcycloalkyl; $C_1$-$C_4$ hydroxyalkyl, or $$-\text{N}\begin{matrix}R'\\R'\end{matrix}$$

is replaced by a heterocyclic radical bound to the alkyl chain through the nitrogen atom. The polymeric composition may include ammonium or amine phosphates.

19 Claims, No Drawings

SELF-EXTINGUISHING POLYMERIC COMPOSITIONS

BACKGROUND OF THE INVENTION

The present invention relates to self-extinguishing compositions based on thermoplastic polymer or on polymers showing elastomeric properties, particularly olefinic polymers or copolymers, containing salts of triazine compounds, optionally combined with reduced quantities of ammonium phosphates or of amine phosphates.

Different solutions are known in the art to reduce or remove the combustibility of polymers. Some of these solutions are based on the use of metal compounds, especially antimony, bismuth or arsenic, combined with organic compounds partially halogenated and thermically unstable, such as chlorinated parafinic waxes.

Other solutions are based on the use of substances able to produce intumescence. The formulations of the intumescent type are generally consisting of the polymer and of at least three main additives: one essentially phosphorated, the aim of which is to give, in combustion, an impermeable semisolid vitreous layer consisting essentially of polyphosphoric acid and to activate the process of intumescence formation; a second additive containing nitrogen which fulfills the function of foaming agent and a third additive containing carbon which acts as carbon donor for the char formation between the polymer and the flame.

Examples of intumescent formulations of this type are those described in U.S. Pat. No. 3,810,862 (Phillips Petroleum Co.) based on melamine, pentaerythritol and ammonium polyphosphate, U.S. Pat. No. 4,727,102 (Vamp s.r.l.) based on melamine cyanurate, a hydroxyalkyl derivative of the isocyanuric acid and ammonium polyphosphate and in the Published Patent Application WO 85/05626 (Plascoat U.K. Limited) based on different compounds of phosphorus and nitrogen, among which, in particular, a combination of melamine phosphate, pentaerythritol and ammonium polyphosphate.

In more recent formulations together the use of an organic or inorganic phosphorus compound an organic compound has been used containing nitrogen, generally an aminoplastic resin obtained by condensing urea, melamine or dicyandiamide with formaldehyde.

Examples of formulations comprising two additives are those described in U.S. Pat. No. 4,504,610 (Montedison S.p.A.) based on oligomeric derivatives of 1,3,5-triazine and ammonium polyphosphate and in European Patent 14,463 (Montedison S.p.A.) based on organic compounds selected from benzylguanamine and reaction products between aldehydes and different nitrogenous cyclic compounds, in particular benzylguanamine-formaldehyde copolymers, and on ammonium polyphosphate.

It is also possible to obtain self-extinguishing compositions using monocomponent additives, containing in the organic molecule both the nitrogen and phosphorus, as described in U.S. Pat. No. 4,201,705 (Borg-Warner Corp.).

These intumescent retarder system give the property of leading to the formation of a carbonaceous residue in the event of a fire or application of a flame to the polymer containing them. Retarder systems of this type have many advantages: absence of corrosion phenomena in apparatus wherein polymer are processed, lower smoke emission in comparison with systems containing metal compounds and halogenated hydrocarbons, and above all the possibility to confer satisfactory antiflame properties to polymers, using a lower quantity of total additive and therefore without excessive decay of the mechanical properties of the polymers themselves.

SUMMARY OF THE INVENTION

The Applicant have now surprisingly found that it is possible to confer satisfactory antiflame properties to the above mentioned polymers by using monocomponent additives which allow to obtain polymeric compositions free of ammonium phosphate or amine that is very good antiflame properties using together with the above mentioned additives a quantity of ammonium phosphates or of an amine very lower than that used in the prior art.

Furthermore, the Applicant have surprisingly found that it is possible to obtain said very good results using phosphorus-nitrogenous compounds having a very simple structure, based on derivatives of the 2,4,6-triamino-1,3,5-triazine salified with an acid containing phosphorus, and a good heat stability, thus maintaining a high activity of flame retarders also when the polymeric composition containing them are heat-processed. The use of the above mentioned not salified derivatives of the 2,4,6-triamino-1,3,5-triazine of the general formula (I) combined with ammonium phosphates or an amine described in the copending Italian Patent Application 21066 A/89 in name of the Applicant.

As previously said, there are known in the art saline derivatives of the 2,4,6-triamino-1,3,5-triazine (melamine) containing phosphorus, useable as co-additives for self-extinguishing compositions in many polymeric matrices, mainly polyolefinic matrices. These compounds, such as for instance melamine phosphate and melamine pyrophosphate, require the presence of other additives, in particular a component containing the carbon necessary for the char formation, such as a polyol (pentaerythritol, dipentaerythritol, tripentaerythritol) to carry on their action as flame retarders.

On the contrary, the compounds of the present invention are used in the formulation of polymeric materials as flame-retarder additives of the intumescent type "char-forming" without the aid of other co-additives.

Furthermore, the compositions which are the object of the present invention have the advantage of giving a very moderate and not darkening smoke emission.

DESCRIPTION OF THE PREFERRED EMBODIMENTS

More particularly, the compositions of the present invention comprise:

a) from 90 to 40 parts by weight of a thermoplastic polymer or of a polymer showing elastomeric properties;

b) from 10 to 60 parts by weight, preferably from 12 to 40, of one or more derivative compounds of 2,4,6-triamino-1,3,5-triazine, salified with an oxygenated acid of phosphorus, said derivatives of the 2,4,6-triamine-1,3,5-triazine having the general formula (I):

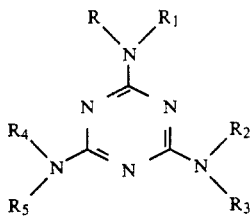 (I)

wherein at least one of radicals from R to $R_5$ is:

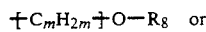 or

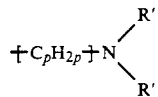

with:
m = integer comprised between 2 and 8, and preferably between 2 and 4;
p = integer comprised between 2 and 6; and preferably $C_1-C_4$ alkyl;
$R_8$ = H; $C_1-C_8$ alkyl;/$C_2-C_6$ alkenyl;

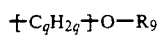

wherein q is an integer comprised between 1 and 4 and $R_9$ is hydrogen or $C_1-C_4$ alkyl; $C_6-C_{12}$ cycloalkyl or alkylcycloalkyl;
radicals R', equal or different between them, are H; $C_1-C_8$ alkyl; $C_2-C_6$ alkenyl; $C_6-C_{12}$ cycloalkyl or alkylcycloalkyl; $C_1-C_4$ hydroxyalkyl; or the group:

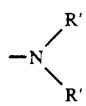

is replaced by a heterocyclic radical bound to the alkyl chain through the nitrogen atom and optionally containing another heteroatom preferably selected from O, S and N; or in the formula (I) at least one of groups:

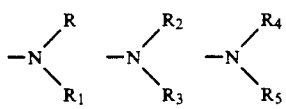

is replaced by a heterocyclic radical bound to the triazinic ring through the nitrogen atom and containing optionally another hetroatom selected preferably from O, S and N; the other radicals from R to $R_5$, equal or different among them, have the above specified meaning or are: H; $C_1-C_{18}$ alkyl; $C_2-C_8$ alkenyl; $C_6-C_{16}$ cycloalkyl or alkylcycloalkyl, optionally substituted by a hydroxy or $C_1-C_4$ hydroxyalkyl function.

Preferably component (b) is selected from salts of the general formula (II)

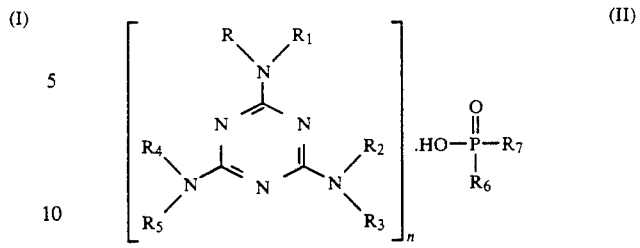 (II)

wherein radicals from R to $R_5$ have the previously described meaning, provided that, when radicals R' are H; $C_1-C_8$ alkyl; $C_2-C_6$ alkenyl; $C_6-C_{12}$ cycloalkyl or alkylcycloalkyl; $C_1-C_4$ hydroxyalkyl, radicals $R_6$ and $R_7$, hereinafter described, are respectively different from H and OH; n is a number varying up to 6, in particular from 0.5 to 5; $R_6$ is H; OH; —O—$C_1-C_8$ alkyl; O-aryl, optionally substituted by a $C_1-C_8$ alkyl; aralkyl, optionally substituted by a $C_1-C_4$ alkyl; $C_1-C_4$ alkyl, optionally substituted by a carboxy group; aryl; $R_7$ is H; OH; —O—$C_1-C_8$ alkyl; —O—aryl; $C_1-C_4$ alkyl; aryl; furthermore, $R_7$ is:

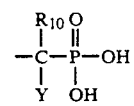

wherein $R_{10}$ is hydrogen or $C_1-C_{12}$ alkyl and Y is OH or $R_{10}$;

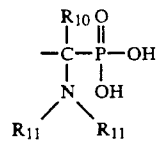

wherein $R_{10}$ has the previously defined meaning and radicals $R_{11}$, equal or different between them, are hydrogen or $C_1-C_4$ alkyl; or the group

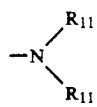

is replaced by a heterocyclic radical bound to the carbon atom through the nitrogen atom and optionally containing another heteroatom, preferably selected from O, S, N;

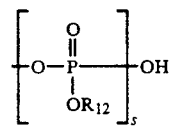

wherein $R_{12}$ is hydrogen or $C_1-C_8$ alkyl and s is an integer comprised between 1 and 3;

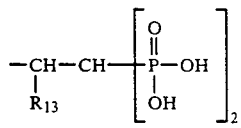

wherein $R_{13}$ is hydrogen or hydroxyl;

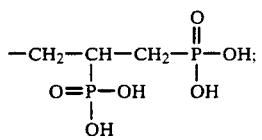

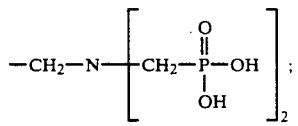

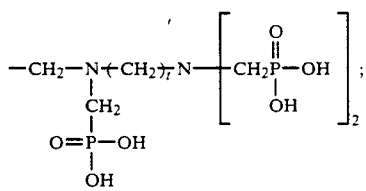

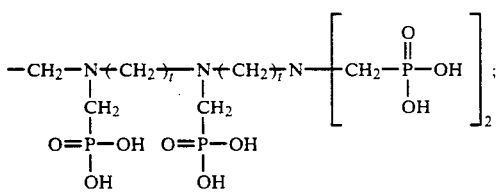

wherein t is an integer comprised between 2 and 6; or $R_6$ and $R_7$ together may represent a cyclic structure of the formula:

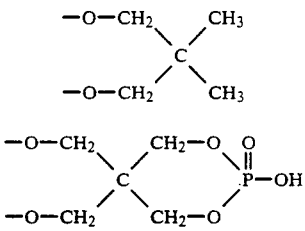

If a further increase of the characteristics of self-extinguishing to flame is required for the polymeric compositions of the present invention, it is possible to add them with from 1 to 25 parts by weight of one or more ammonium or of an amine phosphate in place of an equal number of parts by weight of the component (b).

Examples of radicals from R to $R_5$ comprised in the general formula (I) are: methyl; ethyl; propyl; isopropyl; n-butyl; isobutyl; terbutyl; n-pentyl; isopentyl; n-hexyl; ter-hexyl; octyl; ter-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; (7-hy-) droxyhexyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino)ethyl; 3-(N,N-dimethylamino)propyl; 4-(N,N-dimethylamino)butyl; 5-(N,N-dimethylamino)pentyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)hexyl; 2-(N-ethenylamino)ethyl; 2-(N-cyclohexylamino)ethyl; 2-(N-2-hydroxyethylamino)ethyl; 2-(2-hydroxyethoxy)ethyl; 2-(2-methoxyethoxy)ethyl; 6-(N-propylamino)hexyl; etc.

Examples of heterocyclic radicals which may replace the groups:

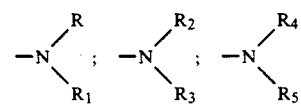

in the general formula (I) are: aziridine; pyrrolidine, piperidine, morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; etc.

Examples of heterocyclic radicals which may replace the group

are: aziridine, pyrrolidine, piperidine, morpholine, thiomorpholine; piperazine; 4-methylpiperazine; 4-ethylpiperazine; etc.

Examples of acids containing phosphorus are: hypophosphorous acid; phosphorous acid; phosphoric acid; pyrophosphoric acid; tripolyphosphoric acid; ethane-1,1,2-triphosphonic acid; 2-hydroxyethane-1,1,2-triphosphonic acid; propane-1,2,3-triphosphonic acid; isopropylphosphoric acid; n-butylphosphoric acid; di-n-butylphosphoric acid; diisopropylphosphoric acid; di-n-pentylphosphoric acid; isooctylphosphoric acid; hexylphosphoric acid; 2-ethylhexylphosphoric acid; methylphosphonic acid; ethylphosphonic acid; n-propylphosphonic acid; butylphosphonic acid; aminomethylphosphonic acid; phenylphosphoric acid; phenylphosphonic acid; di-n-butylpyrophosphoric acid; di(2-ethylhexyl)-pyrophosphoric acid; octylphenylphosphoric acid; 2-methylbenzylphosphonic acid; 1-aminoethane-1,1-diphosphonic acid; 1-hydroxyethane-1,1-diphosphonic acid; 1-hydroxydodecane-1,1-diphosphonic acid; 1-(N-methylamino)ethane-1,1-diphosphonic acid; N,N-dimethylaminomethane-1,1-diphosphonic acid; N-butylaminomethane-1,1-diphosphonic acid; phosphonoacetic acid; 2-phosphonopropionic acid; 3-phosphonopropionic acid; 2-phosphonobutyric acid; 2-hydroxy-5,5-dimethyl-2-oxo-1,3,2-dioxophosphorinane;

3,9-dihydroxy-2,4,8,10-tetraoxo-3,9-diphosphaspiro[5,-5]undecane-3,9-dioxide; aminotris(methylenphosphonic)acid; ethylendiaminotetra (methylenphosphonic)acid; examethylendiaminotetra(methylenphosphonic) acid; diethylentriaminopenta (methylenphosphonic)acid; etc.

Particularly preferred are salts of compounds of formula (I) wherein one or two of groups:

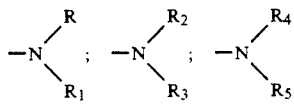

are groups:

Specific salts of compounds of the formula (I) which can be advantageously used in the compositions of the present invention, are reported in examples following the present description.

Salts which represents the component (b) can be prepared according to processes described in details in a copending Italian Patent Application in name of the Applicant.

In short, the above mentioned salts can be synthetized by allowing n mols of a derivative of the 2,4,6-triamine-1,3,5-triazine of the general formula (I)

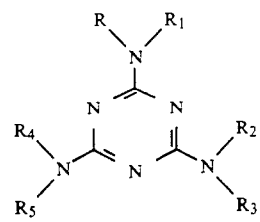

wherein n and substituents from R to $R_5$ have the meaning previously defined, to react in the presence of a suitable solvent (such as for instance water, methyl alcohol, ethyl alcohol, acetonitrile, etc.) at temperatures comprised between 0° C. and the boiling point of the used solvent, with one mol of an acid containing phosphorus, or in absence of solvent and with an excess of the acid containing phosphorus, if this last can act as solvent, at temperatures comprised between 0° and 150° C.

The saline product thus formed can be easily separated from the reaction mass by filtration or by distillation, of the solvent.

Generally, products are obtained showing a good quality, in form of white crystalline powder, useable in the self-extinghuishing polymeric compositions without any further purification.

Many of the intermediates of the general formula (I) are known; however they can be easily synthetized according to the following general method:

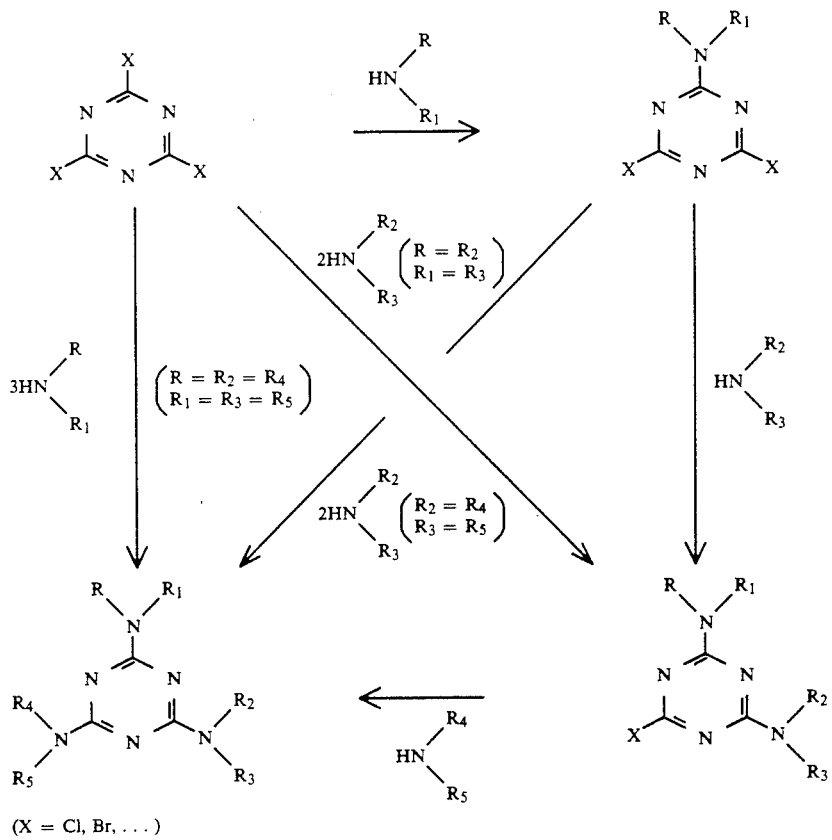

or according to what reported in the Italian Patent Application 21066 A/89 filed by the Applicant on Jul. 3, 1989.

Among phosphates which may be used in addition to component (b), ammonium polyphosphates comprised in the general formula $(NH_4)_{n+2}P_nO_{3n+1}$, wherein n represents an integer equal to or higher than 2 are preferred; preferably, the molecular weight of polyphosphates must be sufficiently high to warrant a low solubility in water. For examaple, n varies preferably from 2 to 500.

The composition of polyphosphates having the above indicated formula, wherein n is a number sufficiently high and preferably comprised between 5 and 500, is practically that corresponding to the formula of methaphosphates $(NH_4PO_3)_n$.

An example of said polyphosphates is known under the trade name "EXOLIT 422"(manufatured and sold by Hoechst Co.) having the composition $(NH_4PO_3)_n$ wherein n is higher than 50; another example is the product known under the trade mark "Phos-Chek P/30" (Monsanto Chemical) having analogous composition.

Another polyphosphate which can be advantageously used, in particular owing to the reduced solubility in water, is that known under the trade name "EXOLIT 462" (manufactured and sold by Hoechst) and corresponding to EXOLIT 422 microincapsulated in melamine-formaldehyde resin.

Other phosphates useable are those derived from amines, such as for instance dimethylammonium or diethylammonium phosphate, ethylendiamine phosphate, melamine ortho or pyro phosphate.

Among polymers useable in the compositions of the present invention polymers or copolymers of the general formula $R—CH=CH_2$ wherein R is a hydrogen atom or a $C_1-C_8$ alkyl or aryl radical, are preferred. In particular:
1. isotactic or prevailingly isotactic polypropylene;
2. HDPE, LLDPE, LDPE polyethylene;
3. crystalline copolymers of propylene with lower amounts of ethylene and/or other alpha-olefins, such as for instance butene-1, hexene-1; octene-1; 4-methyl-pentene-1.
4. heterophasic compositions comprising (A) a homopolymeric fraction of propylene or one of copolymers mentioned at point (3) and (B) a copolymeric fraction consisting of elastomeric copolymers of ethylene with an alpha-olefin, optionally containing lower amounts of a diene, wherein the alpha-olefin is preferably selected from propylene and butene-1;
5. elastomeric copolymers of ethylene with alpha-olefins, optionally containing smaller quantities of a diene. Examples od dienes among those commonly present in the above mentioned copolymers are butadiene, ethylidene-norbornene, hexadiene-1,4.

Among polymers of olefins of formula $R—CH=CH_2$ wherein R is an alkyl radical, "crystal" polystyrene and anti-shock polystyrene are those preferred.

Other examples of polymers commonly useable are terpolymers and copolymers ABS and SAN; polyurethane (polyesters and polyethers); polyethyleneterphthalate; polybutyleneterephthalate; polyamides. etc.

The self-extinguishing compositions of the present invention can be prepared according to known methods: for instance, the ammonium phosphate and/or the phosphate of an amine is first intimately mixed with one or more salts of compounds of the general formula (I) finely milled (preferably with particles having a size lower than 70 microns) and the mixture thus obtained is added to the polymer in a turbomixer to give a homogeneous blend which is then extruded and granulated. The granular product thus obtained can be transformed into different articles, according to a whatever of known molding techniques.

Anti-flame additives of the present invention can be used also in the field of antifire paints.

Examples reported hereinfter illustrate the characteristic points of the invention without limiting them.

EXAMPLE 1

184.5 g of cyanuric acid chloride and 800 ml of acetone are introduced into a 3 liters reactor, provided with agitator, thermometer, dropping funnel, reflux cooler and heating bath.

The mixture is stirred while heating at 40° C. until a solution is obtained; thereafter, 284 g of a 30% by weight ammonia solution are added within 1 hour and 30 minutes, by keeping the temperature at 40° C. Thereafter, the whole is heated at 45° C. and is kept at this temperature for 4 hours.

After cooling, the product formed is filtered and washed on the filter with water.

After drying in oven at 50°-60° C. under vacuum, 115 g of the intermediate (III):

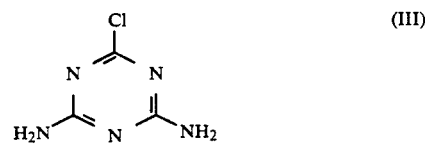

are obtained as infusible white crystalline powder, having a chlorine content equal to 24.12% (theoretic=24.36%).

Furthermore, the structure of said compound has been confirmed by I.R. spectroscopic analysis.

72.8 g of the intermediate (III), 350 g of water and, while agitating, 44 g of piperidine are introduced in a 1 liter reactor provided with agitator, thermometer, feeding funnel, reflux condenser and heating bath.

The mixture is heated to boiling and is kept under reflux for 4 hours.

Thereafter, the mixture is further maintained under reflux for 8 hours by adding 20 g of sodium hydroxide in 50 g of water, in portions, in such a manner to maintain the pH comprised between 7 and 8.

The mixture is cooled to room temperature and the formed product is filtered and washed on the filter with water.

After drying in oven at 60° C. in vacuo, 90 g of 2,4-diamino-6-piperidino-1,3,5-triazine are obtained in form of .white crystalline powder; m.p.=215°-217° C. (m.p.=melting point).

77.6 g of 2,4-diamino-6-piperidino-1,3,5-triazine, 400 ml of water and, under agitation, 48.4 g of 85% by weight phosphoric acid are introduced into the same 1 liter reactor.

The mixture is heated at 80° C. and is kept at this temperature for 4 hours.

After cooling to 10° C., the product formed is filtered and washed with water on the filter.

After drying in oven at 100° C., 96 g of the product:

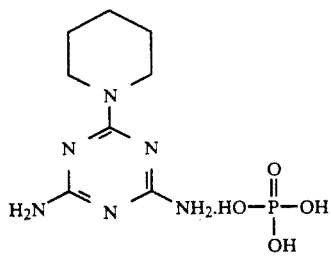

are obtained in form of white crystalline powder; m.p.=228°-230° C.; phosphorus content equal to 10.52% (theoretic 10.61%).

EXAMPLE 2

49.0 g of intermediate (III), 150 ml of water and 26.2 g of 2-methoxyethylamine are introduced into a 0.5 liter reactor, equipped as in example 1.

The mass is heated to boiling and is kept under reflux for 4 hours.

Thereafter, a solution consisting of 14 g of sodium hydroxide in 50 ml of water is added within 20 minutes.

After having further agitated the whole for 30 minutes, the distillation of water begins; the residue mass is then treated with three portions, each of 100 ml, of acetonitrile to extract the organic product.

By subsequent distillation of the solvent, 52.5 g of 2,4-diamino-6-(2-methoxyethyl)amino-1,3,5-triazine are obtained in form of white powder; m;p. 166°-169° C.

Into the same 1 liter reactor of example 1, 52.5 g of 2,4-diamino-6-(2-methoxyethyl)amino-1,3,5-triazine, 600 ml of acetonitrile and, under agitation, 34.5 g of a 85% by weight phosphoric acid are fed.

The mass is heated to boiling and is kept under reflux for 4 hours.

After cooling to room temperature, the product formed is filtered and washed with acetonitrile on the filter.

After drying in oven at 100° C., 78 g of the product:

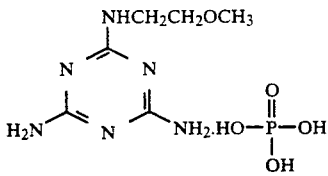

are obtained in form of white crystalline powder; m.p.=186°-188° C.; phosphorus content equal to 11.0% (theoretic 10.98%).

EXAMPLE 3

91 g of the intermediate (III), 240 ml of toluene as well as 110 g of morpholine are introduced in the same 1 liter reactor described in example 1.

The mixture is heated at 65°-70° C. and is kept at this temperature for 2 hours; thereafter the mixture is heated to boiling and is kept under reflux for 1 hour. The whole is allowed to cool to room temperature and thereafter the product formed is separated by filtration. The cake is washed abundantly with water and after drying 92 g of 2,4-diamino-6-morpholino-1,3,5-triazine are obtained in form of white crystalline powder; m.p.=248°-250° C.

39.2 g of 2,4-diamino-6-morpholino-1,3,5-triazine, 250 cc of acetonitrile and, while agitating, 24.2 g of a 85% by weight phosphoric acid are introduced in a 0.5 liter reactor equipped as in example 1.

The mixture is heated to boiling and is kept under reflux for 8 hours.

By working as described in example 2, 57 g of product:

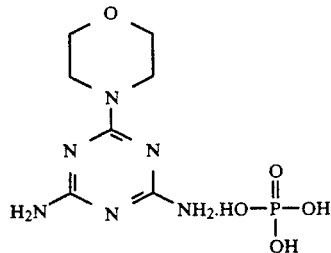

are obtained in form of white crystalline powder; m.p.=250°-252° C. and phosphorus content equal to 10.5% (theoretic 10.54%).

EXAMPLE 4

72.8 g of the intermediate (III), 250 ml of water and, while agitating, 104 g of thiomorpholine are introduced in a 1 liter reactor equipped as in example 1.

The mass is heated to boiling and is kept under reflux for 8 hours.

The whole is cooled to room temperature and the product formed is filtered and the cake is washed with water.

After drying in oven at 100° C., 90.2 g of 2,4-diamino-6-thiomorpholine-1,3,5-triazine are obtained in form of a white crystalline powder; m.p.=237°-239° C.

In the same 1 liter reactor, 41.4 g of 2,4-diamino-6-thiomorpholino-1,3,5-triazine, 300 ml of water and while agitating 32.5 g of phenylphosphonic acid are introduced.

The mixture is heated at 80° C. and is kept at this temperature for 6 hours.

The whole is cooled to room temperature, the product formed is filtered and the cake is washed on the filter with a little water.

After drying in oven at 100° C., 64.7 g of the product:

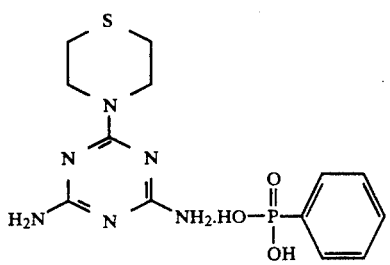

are obtained in form of white crystalline powder; m.p.=265°-269° C.; phosphorus content equal to 8.14% (theoretic=8.38%).

EXAMPLE 5

136 g of the intermediate (III) and 800 ml of xylene are introduced in the same 3 liters reactor of example 1.

The suspension is heated at 120° C. and within 1 hour 302 g of ethyl ester of N-piperazincarboxylic acid are added.

The whole is kept at 125°-130° C. for 2 hours, then it is cooled to room temperature and the product formed is filtered washing the cake first with xylene and thereafter, abundantly, with water.

After drying in oven at 100° C., 230 g of the intermediate (IV):

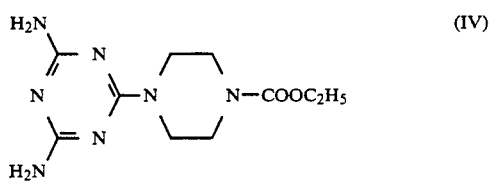

are obtained in form of white crystalline powder; m.p.=210°-215° C.

The structure of the intermediate (IV) has been further confirmed by NMR analysis.

1000 ml of acetic acid, 620 g of acetic solution of a 33% by weight hydrobromic acid and 120 g of the intermediate (IV) are introduced in the same reactor.

The mixture is heated at 95° C. and is kept under agitation at this temperature for 6 hours.

Subsequently, the mixture is cooled to room temperature, the product formed is filtered and washed on the filter with acetic acid.

The squeezed cake is then treated in a 2 liters glass with 500 ml of water and added, under agitation, with a sodium hydroxide solution (50% by weight) until a pH value equal to 11 is reached.

The whole is maintained under agitation for one further hour; thereafter, the product formed is filtered and washed abundantly on the filter with water.

After drying in oven at 100° C., 60 g of 2,4-diamino-6-piperazino-1,3,5-triazine are obtained in form of white powder; m.p.=262°-268° C.

106.4 g of tetrasodium pyrophosphate and 600 ml of water are introduced in the same 1 liter reactor of example 1, but provided with cooling bath.

The mixture is cooled to 5° C. from the outside, thereafter, 158 g of a 37% by weight hydrochloric acid are added, thus obtaining a solution.

To this solution, always kept at 5° C., 78 g of 2,4-diamino-6-piperazino-1,3,5-triazine are added.

The solution is maintained under agitation for 2 hours at the same temperature of 5° C., then it is heated at 10° C. and kept at this new temperature for 3 hours.

After having cooled to 2° C., the product formed is separated by filtration, the cake is washed on the filter with a little cold water.

After drying in oven at 100° C., 102 g of the product:

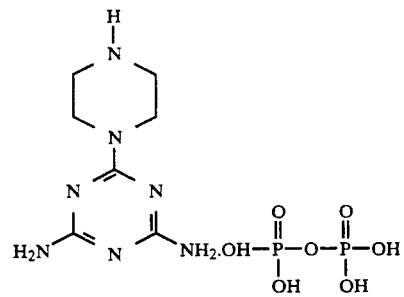

are obtained in form of white crystalline powder; m.p.=295°-298° C.; phosphorus content equal to 16.8% (theoretic 16.61%).

EXAMPLE 6

184.5 g of cyanuric acid chloride and 1300 ml of methylene chloride are introduced in a 3 liters reactor like that described in example 1, but provided with cooling bath.

While cooling from the outside, 87.2 g of morpholine and 40 g of sodium hydroxide dissolved in 150 g of water are contemporarily fed within 3 hours, by keeping the pH comprised between 5 and 7 and the temperature comprised between 0 and 3° C.

The mixture is kept at the temperature of from 0° to 3° C. for further 3 hours and thereafter the aqueous phase is separated.

By distilling the methylene chloride, 230 g of the intermediate (V):

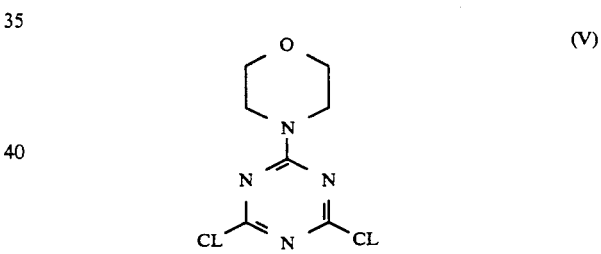

are obtained in form of white crystalline powder; m.p.=155°-157° C.; titre higher than 98% (determined by gas chromatography) and chlorine content equal to 29.87% (theoretic 30.21%).

In a 0.5 liter reactor equipped as in example 1, 100 g of a 30% by weight ammonia solution, 100 ml of water and 70.5 g of the intermediate (V) are introduced.

The mixture is heated at 50° C. and is kept at this temperature for 7 hours; the mixture is allowed to cool to room temperature, the product obtained is filtered and washed with water.

By drying the cake, 58 g of the intermediate (VI):

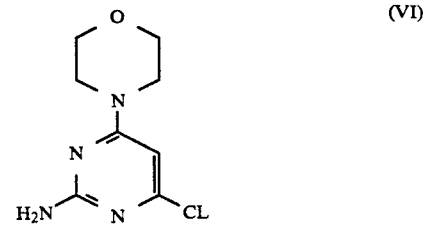

are obtained in form of white crystalline powder; m.p.=189°-191° C.; chlorine content equal to 16.28% (theoretic=16.47%).

The structure of intermediates (V) and (VI) has been further confirmed by IR spectroscopic analysis.

The mass is heated at 80° C. and is kept at this temperature for 1 hour, then the distillation of the solvent begins.

By drying in oven at 100° C. the solid remaining after the distillation, 51.6 g of the product:

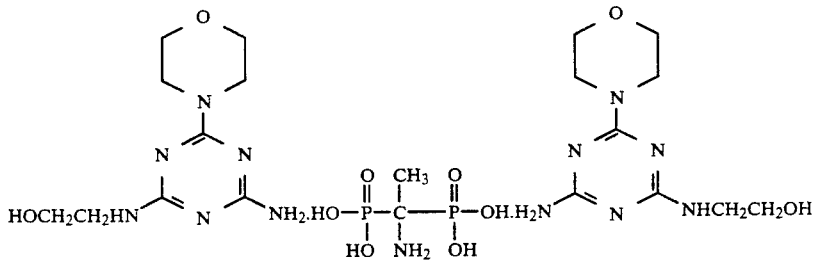

In the same reactor above described, 58 g of the intermediate (VI) and 300 g of water are introduced and thereafter 18 g of 2-aminoethanol while stirring.

The mixture is heated to boiling and is kept under reflux for 3 hours.

Thereafter, it is further kept under reflux for 3 hours adding 11.8 g of sodium hydroxide in 50 g of water, in portions, in such a manner to maintain the pH between 7 and 8.

The mass is cooled, the product obtained is filtered and the cake is washed with water.

After drying, 58 g of 2-amino-4-(2-hydroxyethyl-)amino-6-morpholino-1,3,5-triazine are obtained in form of white powder; m.p.=159°-161° C.

In a 1 liter reactor equipped as described in example 1, 328 g of phosphorous acid and 82 g of acetonitrile are introduced.

The reaction mixture is gradually heated, within 6 hours, up to 160° C.

A white crystalline product is formed.

Subsequently, the product is cooled to 80° C. and to the mass 500 ml of water are added under a good agitation; thereafter, the whole is allowed to cool to room temperature.

The product formed is separated by filtration and is washed on the filter with a little water.

After drying of the cake, 290 g of 1-amino ethane-1,1-diphosphoric acid are obtained in form of white crystalline powder; m.p.=265°-270° C. (decomposition); phosphorus content equal to 29.4% (theoretic 30.24%).

In a 0.5 liter reactor equipped as in example 1, 200 ml of water, 36 g of 2-amino-4-(2-hydroxyethyl)amino-6-morpholino-1,3,5-triazine and 16 g of 1-aminoethane-1,1-diphosphonic acid are introduced.

are obtained in form of white crystalline powder; m.p.=144°-148° C.; phosphorus content equal to 8.8% (theoretic 9.04%).

EXAMPLE 7

39.2 g of 2,4-diamino-6-morpholino-1,3,5-triazine (prepared as described in example 3), 300 ml of ethyl alcohol and, under stirring, 17.2 g of phosphorous acid are introduced in a 0.5 liter reactor equipped as in example 1.

The mixture is maintained under agitation at room temperature for 8 hours, then the product formed is filtered and washed on the filter with a little quantity of solvent.

By drying the cake in oven at 100° C., 55 g of the product:

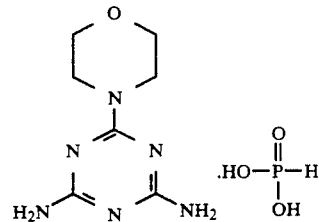

are obtained in form of white crystalline powder; m.p.=240°-244° C.; phosphorus content equal to 11% (theoretic 11.13%).

EXAMPLES 8-32

By working under conditions analogous to those described in examples from 1 to 7, saline products of general formula (II) reported in Table 1 are prepared.

TABLE 1

| EX. N. | R—N—R$_1$ | R$_2$—N—R$_3$ | R$_4$—N—R$_5$ | $\text{HO}-\overset{\overset{\displaystyle O}{\|}}{\underset{R_6}{P}}-R_7$ | n | m.p. (°C.) | % phosphorus found | % phosphorus calculated |
|---|---|---|---|---|---|---|---|---|
| 8 | morpholine | CH$_2$CH$_2$OH | H | H$_3$PO$_4$ | 1 | 185–189 | 8,94 | 9,16 |
| 9 | morpholine | H | H | H$_3$PO$_4$ | 2 | 149–151 | 10,76 | 10,87 |
| 10 | piperazine | H | H | methylenebisphosphonic acid | 1 | 225–229 | 15,25 | 15,50 |
| 11 | morpholine | H | H | 1-amino-1-methyl-methylenebisphosphonic acid | 1 | 230–235 | 15,24 | 15,45 |
| 12 | morpholine | H | H | 1-amino-1-methyl-methylenebisphosphonic acid | 2 | 205–210 | 10,21 | 10,37 |
| 13 | morpholine | morpholine | CH$_2$CH$_2$OH | CH$_3$ | H$_3$PO$_4$ | 1 | 172–174 | 7,62 | 7,34 |
| 14 | morpholine | t-C$_4$H$_9$ | H | H$_3$PO$_4$ | 1 | 173–176 | 8,69 | 8,86 |
| 15 | morpholine | H | H | phenylphosphinic acid | 1 | 252–256 | 8,96 | 9,17 |

TABLE 1-continued

| EX. N. | R—N—R₁ | R₂—N—R₃ | R₄—N—R₅ | $\begin{array}{c}O\\\parallel\\HO-P-R_7\\|\\R_6\end{array}$ | n | m.p. (°C.) | % phosphorus found | % phosphorus calculated |
|---|---|---|---|---|---|---|---|---|
| 16 | morpholine (N-O ring) | CH₂—CH=CH₂ | H | $\begin{array}{c}O\quad O\\\parallel\quad\parallel\\HO-P-O-P-OH\\|\qquad|\\HO\quad\;OH\end{array}$ | 2 | 136–139 | 9,37 | 9,53 |
| 17 | morpholine (N-O ring) | H | H | $\begin{array}{c}O\quad O\quad O\\\parallel\quad\parallel\quad\parallel\\HO-P-O-P-O-P-OH\\|\qquad|\qquad|\\OH\quad OH\quad OH\end{array}$ | 3 | 144–148 | 10,78 | 11,0 |
| 18 | (CH₂)₂O(CH₂)₂OH | H | H | H₃PO₄ | 1 | 149–152 | 7,48 | 7,75 |
| 19 | morpholine (N-O ring) | H | H | $\begin{array}{c}\;\;\;CH_3\;\;O\\\;\;\;|\quad\;\;\parallel\\HO-P-C-P-OH\\\parallel\quad\;|\quad\;|\\O\quad\;HO\;\;OH\end{array}$ | 2 | 179–182 | 10,18 | 10,35 |
| 20 | CH₂CH₂OH | H | H | H₃PO₄ | 1 | 141–144 | 8,80 | 8,86 |
| 21 | thiomorpholine (N-S ring) | cyclohexyl | H | $\left\{\begin{array}{c}O\\\parallel\\HO-P-CH_2CH\\|\qquad\quad|\\HO\qquad OH\end{array}\right\}_2$ | 3 | 192–197 | 9,87 | 10,26 |
| 22 | (CH₂)₅OH | H | H | H₃PO₄ | 1 | 186–189 | 9,78 | 10,0 |
| 23 | CH₂CH₂CH₂N (morpholine) | H | H | H₃PO₃ | 1 | 189–191 | 9,16 | 9,25 |
| 24 | morpholine (N-O ring) | H | H | $\begin{array}{c}\text{spirocyclic bisphosphonate}\\\text{(C with CH}_2\text{O-P=O(OH)} \text{ groups)}\end{array}$ | 2 | 262–267 | 9,35 | 9,50 |

TABLE 1-continued

| EX. N. | R—N—R$_1$ | R$_2$—N—R$_3$ | | R$_4$—N—R$_5$ | $\begin{array}{c} O \\ \parallel \\ HO-P-R_7 \\ \vert \\ R_6 \end{array}$ | n | m.p. (°C.) | % phosphorus found | % phosphorus calculated |
|---|---|---|---|---|---|---|---|---|---|
| 25 | morpholine | H | H | H | $\begin{array}{c} O \\ \parallel \\ HO-P-O\text{-}nC_4H_9 \\ \vert \\ OH \end{array}$ 40% <br> $\begin{array}{c} O \\ \parallel \\ HO-P-O\text{-}nC_4H_9 \\ \vert \\ O\text{-}nC_4H_9 \end{array}$ 60% | 1 | 152–182 | 8,04 | 8,12 |
| 26 | CH$_2$CH$_2$OH | CH$_2$CH$_2$OH | H | H | $\begin{array}{c} O\ C_{11}H_{23}\ O \\ \parallel\ \vert\ \parallel \\ HO-P-C-P-OH \\ \vert\ \vert\ \vert \\ HO\ OH\ OH \end{array}$ | 2 | 139–143 | 7,64 | 8,01 |
| 27 | morpholine | N | O | H | H$_3$PO$_4$ | 1 | 242–244 | 8,50 | 8,52 |
| 28 | morpholine | N | O | CH$_2$CH$_2$OCH$_3$ | H$_3$PO$_4$ | 1 | 179–182 | 7,87 | 7,35 |
| 29 | piperazine (NH) | H | H | H | H$_3$PO$_4$ | 0,5 | 200–205 | 15,82 | 15,86 |
| 30 | (CH$_2$)$_2$OCH=CH$_2$ | CH$_3$ | H | H | H$_3$PO$_4$ | 1 | 162–165 | 9,90 | 10,06 |
| 31 | morpholine | H | H | H | $\left[ \begin{array}{c} O \\ \parallel \\ CH_2P-OH \\ \vert \\ OH \end{array} \right]_3 N$ | 3 | 136–142 | 10,32 | 10,48 |

TABLE 1-continued
| EX. N. | R—N—R$_1$ | R$_2$—N—R$_3$ | R$_4$—N—R$_5$ | $\begin{array}{c} O \\ \| \\ HO-P-R_7 \\ \| \\ R_6 \end{array}$ | n | m.p. (°C) | % phosphorus found | calculated |
|---|---|---|---|---|---|---|---|---|
| 32 | 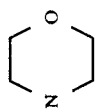 | H  H | H  H | $(CH_2)_2N\left[CH_2\underset{OH}{\overset{\overset{\displaystyle O}{\|}}{P}}-OH\right]_2$  $\|$  $N-CH_2-\underset{OH}{\overset{\overset{\displaystyle O}{\|}}{P}}-OH$  $\|$  $(CH_2)_2N\left[CH_2\underset{OH}{\overset{\overset{\displaystyle O}{\|}}{P}}-OH\right]_2$ | 5 | 185–190 | 9,78 | 9,98 |

TABLES 2 AND 3

Tests reported in the above specified tables relate to polymeric compositions containing salts prepared according to the preceding examples.

Specimens have been prepared in form of little plates having a thickness of about 3 mm, by molding mixtures of granular polymer and additives in a plate press MOORE, by working for 7 minutes at a pressure of 40 kg/cm$^2$.

On the plates thus obtained the self-extinguishing level has been determined by measuring the oxygen index (L.O.I. according to ASTM D-2863/77) in a Stanton Redcroft apparatus and applying the "Vertical Burning Test" which allows to classify the material at three levels 94V-0, 94V-1, 94V-2 according to UL 94 rules (published by "Underwriters Laboratories"-USA).

In Table 2 values are reported which have been obtained by using an isotactic polypropylene in flakes, having a Melt Flow Index equal to 12 and an unsoluble fraction in boiling n-heptane equal to 96% by weight.

In Table 3 values are reported which have been obtained by the use of a granular low density polyethylene having a Melt Flow Index equal to 7; a granular polystyrene containing 5% by weight of butadiene rubber and having a Melt Flow Index equal to 9; a thermoplastic polyurethane either polyester (ESTANE 54600 ®) by Goodrich) or polyether (ESTANE 58300 ®) by Goodrich) in granules, having specific gravity equal to 1.19 and 1.10 g/cm$^3$ respectively; an elastomeric ethylene-propylene copolymer having a percent content by weight of propylene equal to 45; an acrylonitrile-butadiene-styrene terpolymer having a specific gravity equal to 1.06 g/cm$^3$, Melt Flow Index equal to 1.6 and containing about 40% of acrylonitrile and styrene and 20% of butadiene.

TABLE 2

| Example N. | Product Example N. | Prod-uct | PP (1) | AO (2) | APP (1) | L.O.I. (ASTM D2863) | UL 94 3 mm |
|---|---|---|---|---|---|---|---|
| 33 | 1 | 34 | 65 | 1 | 0 | 29,5 | V0 |
| 34 | 2 | 34 | 65 | 1 | 0 | 31,7 | V0 |
| 35 | 2 | 20 | 70 | 1 | 9 | 33,4 | V0 |
| 36 | 3 | 29 | 70 | 1 | 0 | 30,8 | V0 |
| 37 | 3 | 9,5 | 80 | 1 | 9,5 | 32,0 | V1 |
| 38 | 3 | 26,1 | 65 | 1 | 7,9 | 39,0 | V0 |
| 39 | 4 | 29 | 70 | 1 | 0 | 30,4 | V0 |
| 40 | 4 | 24 | 70 | 1 | 5 | 33,1 | V0 |
| 41 | 5 | 34 | 65 | 1 | 0 | 34,0 | V0 |
| 42 | 5 | 12 | 75 | 1 | 12 | 37,0 | V0 |
| 43 | 6 | 34 | 65 | 1 | 0 | 32,0 | V0 |
| 44 | 6 | 12 | 75 | 1 | 12 | 36,5 | V0 |
| 45 | 7 | 22 | 77 | 1 | 0 | 28,6 | V2 |
| 46 | 7 | 29 | 70 | 1 | 0 | 32,1 | V0 |
| 47 | 7 | 13 | 73 | 1 | 13 | 37,8 | V0 |
| 48 | 8 | 34 | 65 | 1 | 0 | 32,2 | V0 |
| 49 | 9 | 34 | 65 | 1 | 0 | 30,4 | V0 |
| 50 | 10 | 34 | 65 | 1 | 0 | 31,5 | V0 |
| 51 | 11 | 34 | 65 | 1 | 0 | 38,8 | V0 |
| 52 | 11 | 23,2 | 70 | 1 | 5,8 | 41,8 | V0 |
| 53 | 12 | 34 | 65 | 1 | 0 | 32,1 | V0 |
| 54 | 13 | 23,2 | 70 | 1 | 5,8 | 31,8 | V0 |
| 55 | 14 | 25,8 | 70 | 1 | 3,2 | 32,9 | V0 |
| 56 | 15 | 34 | 65 | 1 | 0 | 33,6 | V0 |
| 57 | 16 | 13 | 73 | 1 | 13 | 34,2 | V0 |
| 58 | 17 | 34 | 65 | 1 | 0 | 31,9 | V0 |
| 59 | 17 | 13 | 74 | 1 | 12 | 35,1 | V0 |
| 60 | 18 | 23,2 | 70 | 1 | 5,8 | 33,9 | V0 |
| 61 | 19 | 34 | 65 | 1 | 0 | 31,6 | V0 |
| 62 | 20 | 13,5 | 72 | 1 | 13,5 | 36,2 | V0 |
| 63 | 21 | 25,8 | 70 | 1 | 3,2 | 33,5 | V0 |
| 64 | 22 | 34 | 65 | 1 | 0 | 30,9 | V0 |
| 65 | 23 | 34 | 65 | 1 | 0 | 30,4 | V0 |
| 66 | 24 | 23,2 | 70 | 1 | 5,8 | 31,1 | V0 |
| 67 | 25 | 12 | 75 | 1 | 12 | 34,3 | V0 |
| 68 | 26 | 25,8 | 70 | 1 | 3,2 | 33,0 | V0 |
| 69 | 27 | 23,2 | 70 | 1 | 5,8 | 34,4 | V2 |
| 70 | 28 | 14 | 72 | 1 | 13 | 34,6 | V1 |
| 71 | 29 | 34 | 65 | 1 | 0 | 33,7 | V0 |
| 72 | 29 | 23,2 | 70 | 1 | 5,8 | 34,1 | V0 |
| 73 | 30 | 34,0 | 65 | 1 | 0 | 31,8 | V0 |
| 74 | 31 | 39,0 | 60 | 1 | 0 | 30,3 | V0 |
| 75 | 32 | 34 | 65 | 1 | 0 | 33,6 | V0 |
| 76 | 3 | 14 | 78 | 1 | *7 | 31,8 | V0 |
| 77 | 5 | 16 | 75 | 1 | *8 | 36,5 | V0 |

(1) PP = polypropylene
APP = ammonium polyphosphate Exolit 422 ® (Hoechst)
*APP = microincapsulated with melamine-formaldehyde resin Exolit 462 ® (Hoechst)
(2) AO = antioxidant Mixture consisting of 2 parts of dilaurylthiopropionate and 1 part of pentaerythritoltetra-[3-(3,5-di-terbutyl-4-hydroxyphenyl)propionate] of

TABLE 3

| EX. N. | Polymeric carrier | Product Example N. | Polymer | Product | AO (2) | APP (1) | L.O.I. (ASTM-D2863) | UL 94 3 mm |
|---|---|---|---|---|---|---|---|---|
| 78 | LDPE | 3 | 60 | 31,2 | 1 | 7,8 | 32,8 | V1 |
| 79 | (1) | 4 | 61 | 25,2 | 1 | 12,8 | 31,4 | V0 |
| 80 |  | 8 | 55 | 39,2 | 1 | 4,8 | 30,7 | V2 |
| 81 |  | 8 | 61 | 25,2 | 1 | 12,8 | 35,8 | V0 |
| 82 |  | 19 | 60 | 31,2 | 1 | 7,8 | 33,1 | V0 |
| 83 |  | 6 | 60 | 31,2 | 1 | 7,8 | 29,8 | V2 |
| 84 | HIPS | 4 | 60 | 31,2 | 1 | 7,8 | 29,4 | V2 |
| 85 | (1) | 4 | 60 | 19,5 | 1 | 19,5 | 37,2 | V0 |
| 86 |  | 6 | 60 | 19,5 | 1 | 19,5 | 32,4 | V0 |
| 87 |  | 8 | 60 | 19,5 | 1 | 19,5 | 35,8 | V0 |
| 88 |  | 19 | 61 | 25,2 | 1 | 12,8 | 28,8 | V1 |
| 89 | PU | 3 | 70 | 29 | 1 | 0 | 34,3 | V0 |
| 90 | ester (1) | 8 | 70 | 29 | 1 | 0 | 32,4 | V0 |
| 91 |  | 11 | 70 | 29 | 1 | 0 | 34,8 | V0 |
| 92 |  | 5 | 74 | 25 | 1 | 0 | 33,7 | V0 |
| 93 |  | 10 | 74 | 25 | 1 | 0 | 34,5 | V0 |
| 94 |  | 7 | 70 | 29 | 1 | 0 | 34,1 | V0 |
| 95 | PU | 11 | 70 | 29 | 1 | 0 | 31,8 | V0 |
| 96 | ether (1) | 5 | 70 | 29 | 1 | 0 | 32,9 | V0 |
| 97 | PP/PE | 3 | 60 | 39 | 1 | 0 | 32,9 | V0 |
| 98 | (1) | 6 | 72 | 14 | 1 | 13 | 35,6 | V0 |
| 99 |  | 7 | 60 | 39 | 1 | 0 | 32,8 | V0 |
| 100 |  | 2 | 60 | 39 | 1 | 0 | 31,9 | V0 |
| 101 |  | 8 | 73 | 13 | 1 | 13 | 34,2 | V0 |

TABLE 3-continued

| EX. N. | Polymeric carrier | Product Example N. | Parts by weight | | | | L.O.I. (ASTM-D2863) | UL 94 3 mm |
|---|---|---|---|---|---|---|---|---|
| | | | Polymer | Product | AO (2) | APP (1) | | |
| 102 | ABS | 3 | 65 | 17 | 1 | 17 | 27.4 | V0 |
| 103 | (1) | 6 | 65 | 17 | 1 | 17 | 32.1 | V0 |
| 104 | | 8 | 60 | 26 | 1 | 13 | 35.2 | V0 |

(1) APP = ammonium polyphosphate
LDPE = low density polyethylene
HIPS = polystyrene containing 5% of butadiene rubber
PU (ester) = polyurethane polyester
PU (ether) = polyurethane polyether
PP/PE = propylene-ethylene copolymer
ABS = acrylonitrile-butadiene-styrene terpolymer
(2) AO = antioxidant mixture consisting of 2 parts of dilaurylpropionate and 1 part of pentaerythritoltetra-[3-(3,5-di-terbutyl-4-hydroxyphenyl)propionate]

EXAMPLE 105 (COMPARISON EXAMPLE)

By working according to the modalities used in examples from 33 to 77, but using as nitrogenous compound the phosphate (1:1) of 2,4,6-triamino-1,3,5-triazine, the hereinafter specified composition is prepared:

| Polypropylene | 65 parts by weight |
|---|---|
| Antioxidant | 1 part by weight |
| Phosphate (1:1) of the 2,4,6-triamino-1,3,5-triazine | 34 parts by weight |

By using the above composition specimens have been prepared which were allowed to undergo self-estinguishing tests according to the previously described modalities.

The following results have been obtained:

| L.O.I. | 23.5 |
|---|---|
| UL 94 (3 mm) | class B (specimen burns) |

EXAMPLE 106 (COMPARISON EXAMPLE)

By working as in example 105, the hereinafter specified composition is prepared:

| Polypropylene | 73 parts by weight |
|---|---|
| Antioxidant | 1 part by weight |
| Ammonium polyphosphate | 13 parts by weight |
| Phospate (1:1) of 2,4,6-triamino-1,3,5-triazine | 13 parts by weight |

By using the above composition specimens have been prepared which were allowed to undergo self-estinguishing tests according to the previously described modalities. The following results have been obtained.

| L.O.I. | 22.5 |
|---|---|
| UL 94 (3 mm) | class B (specimen burns). |

We claim:
1. Self-extinguishing polymeric compositions comprising:
a) from 90 to 40 parts by weight of a thermoplastic polymer, or of a polymer showing elastomeric properties;
b) from 10 to 60 parts by weight of one or more compounds which is 2,4,6-triamino-1,3,5-triazine salified with an oxygenated acid of phosphorus, said 2,4,6-triamino-1,3,5-triazine having the formula (I):

$$\text{(I)}$$

wherein at least one of radicals from R to $R_5$ is $$-(C_mH_{2m})-O-R_8 \quad \text{or}$$

$$-(C_pH_{2p})-N\begin{array}{c}R'\\ \\R'\end{array}$$

with
m = an integer between 2 and 8;
p = an integer between 2 and 6;
$R_8$ = H, $C_1$-$C_8$ alkyl; $C_2$-$C_6$ alkenyl;

$$-(C_qH_{2q})-O-R_9$$

wherein q is an integer between 1 and 4 and $R_9$ is hydrogen or $C_1$-$C_4$ alkyl; $C_6$-$C_{12}$ cycloalkyl or alkylcycloalkyl; radicals R' are equal or different and are selected from the group consisting of a hydrogen atom; $C_1$-$C_8$ alkyl; $C_2$-$C_6$ alkenyl; $C_6$-$C_{12}$ alkylcycloalkyl; $C_1$-$C_4$ hydroxyalkyl; or the group:

$$-N\begin{array}{c}R'\\ \\R'\end{array}$$

is replaced by a heterocyclic radical bound to the alkyl chain through the nitrogen atom and optionally containing a second heteroatom selected from the group consisting of O, S, N or in formula (I) at least one of the groups:

$$-N\begin{array}{c}R\\ \\R_1\end{array}, \quad -N\begin{array}{c}R_2\\ \\R_3\end{array}, \quad -N\begin{array}{c}R_4\\ \\R_5\end{array}$$

is replaced by a heterocyclic radical bound to the triazine ring through the nitrogen atom and optionally containing a second heteroatom selected from the group consisting of O, S, and N;

radicals from R to $R_5$, are equal or different and have the above specified meaning or are:

a hydrogen atom, $C_1-C_{18}$ alkyl; $C_2-C_8$ alkenyl; $C_6-C_{16}$ cycloalkyl or alkylcycloalkyl, optionally substituted by a hydroxy group or $C_1-C_4$ hydroxyalkyl.

2. Self-extinguishing polymeric compositions according to claim 1, wherein component (B) is selected from among salts having the formula (II):

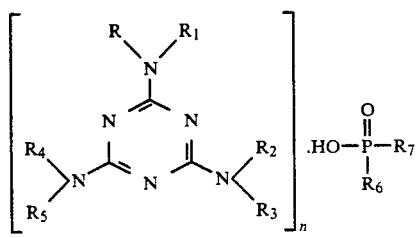
(II)

wherein radicals from R to $R_5$ have the meaning specified in claim 1 provided that, when the radicals R' are a hydrogen atom; $C_1-C_8$ alkyl; $C_2-C_6$ alkenyl; $C_6-C_{12}$ cycloalkyl or alkylcycloalkyl; $C_1-C_4$ hydroxyalkyl, radicals $R_6$ and $R_7$ described hereinafter are respectively different from a hydrogen atom and OH; n is a number varying up to 6; $R_6$ is a hydrogen atom; OH; —O—$C_1-C_8$ alkyl; —O—aryl, optionally substituted by a $C_1-C_8$ alkyl; aralkyl, optionally substituted by a $C_1-C_4$ alkyl; $C_1-C_4$ alkyl, optionally substituted by a carboxylic group; aryl; $R_7$ is a hydrogen atom; OH; —O—$C_1-C_8$ alkyl; —O—aryl; $C_1-C_4$ alkyl; aryl; furthermore, $R_7$ is:

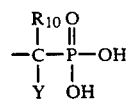

wherein $R_{10}$ is a hydrogen atom or $C_1-C_{12}$ alkyl and Y is OH or $R_{10}$;

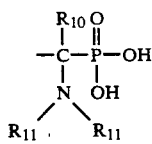

wherein $R_{10}$ has the previously defined meaning and radicals $R_{11}$ are equal or different and are selected from the group consisting of hydrogen or $C_1-C_4$ alkyl; or the group

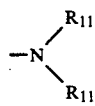

is replaced by a heterocyclic radical bound to the carbon atom through the nitrogen atom and optionally containing a second heteroatom selected from the group consisting of O, S and N;

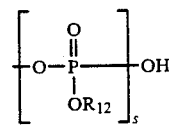

wherein $R_{12}$ is hydrogen or $C_1-C_8$ alkyl and s is an integer between 1 and 3;

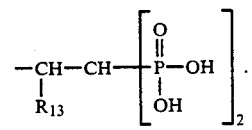

wherein $R_{13}$ is a hydrogen atom or hydroxy;

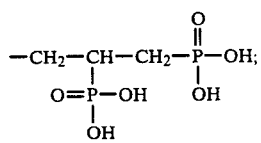

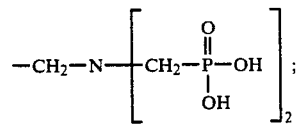

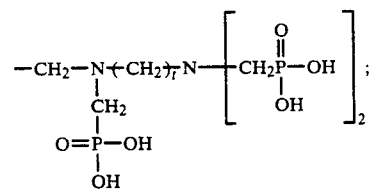

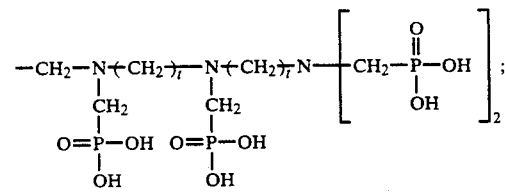

wherein t is an integer between 2 and 6; or $R_6$ and $R_7$ together may form a cyclic structure of the formula:

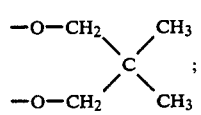

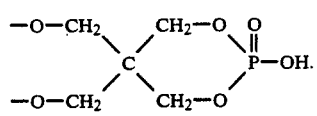

3. Self-extinguishing polymeric compositions according to claim 1 wherein at least one of the radicals from R to $R_5$ in formula I is replaced by:

m is an integer between 2 and 4 and $R_8$ is selected from the group consisting of H or $C_1$-$C_4$ alkyl.

4. Self-extinguishing polymeric compositions according to claim 2 wherein one or two of groups:

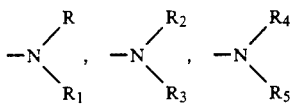

in compounds of general formula II is:

5. Self-extinguishing polymeric compositions according to claim 2 wherein at least one of groups:

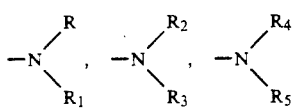

in general formula (II) is replaced by heterocyclic radicals selected from the group consisting of: aziridine; pyrrolidine; piperidine; morpholine; thiomorpholine; piperazine; 4-methylpiperzine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine.

6. Self-extinguishing polymeric compositions according to claim 2 wherein at least one of the radicals from R to $R_5$ in formula (I) is replaced by:

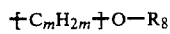

wherein:
m is an integer between 2 and 4 and $R_8$ is a hydrogen atom or $C_1$-$C_4$ alkyl.

7. Self-extinguishing polymeric composition according to claim 2 wherein the group:

is replaced by a heterocyclic radical selected from: aziridine; pyrrolidine; piperidine; morpholine; thiomorpholine; 4-methylpiperidine; 4-ethylpiperidine.

8. Self-extinguishing polymeric compositions according to claim 2 wherein the polymer (a) is selected from polymers and copolymers of olefins of the general formula R—CH=$CH_2$ wherein R is a hydrogen atom or a $C_1$-$C_8$ alkyl or aryl radical; acrylonitrile/butadiene/styrene terpolymers; styrene/acrylonitrile copolymers; polyurethane; polyethyleneterephthalate; polybutyleneterephthalate; polyamides.

9. Self-extinguishing polymeric compositions according to claim 1 wherein one or two of groups:

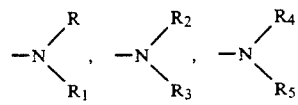

in compounds of general formula (I) is a group:

10. Self-extinguishing polymeric compositions according to claim 1 wherein at least one of the groups:

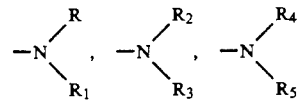

in formula (I) is replaced by heterocyclic radicals selected from the group consisting of: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,4,6-tetramethylpiperazine; 2,2,5,5-tetramethylpiperazine; 2-ethylpiperazine; 2,5-diethylpiperazine.

11. Self-extinguishing polymeric compositions according to any of claims from 1, wherein at least one of the radicals from R to $R_5$ in general formula (1) is replaced by:

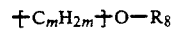

wherein:
m is an integer comprised between 2 and 4 and $R_8$ is H or $C_1$-$C_4$alkyl.

12. Self-extinguishing polymeric composition according claim 1 wherein the group:

is replaced by a heterocyclic radical selected from the group consisting of aziridine; pyrrolidine; piperidine; morpholine; thiomorpholine; 4-methylpiperidine; 4-ethylpiperidine.

13. Self-extinguishing polymeric compositions according to claim 2, wherein the oxygenated acid of phosphorus, according to formula (II) is selected from: ipophosphorous acid; phosphorous acid; phosphoric acid; pyrophosphoric acid; tripolyphosphoric acid; ethane 1,1,2-triphosphonic acid; 2-hydroxyethane-1,1,2-triphosphonic acid; propane-1,2,3-triphosphonic acid; isopropylphosphoric acid; n-butylphosphoric acid; di-n-butylphosphoric acid; diisopropylphosphoric acid; di-n-pentylphosphoric acid; isooctylphospshoric acid; hexylphosphoric acid; 2-ethylhexylphosphoric acid; methylphosphonic acid; ethylphosphonic acid; n-propylphosphonic acid; n-butylphosphonic acid; aminomethylphosphonic acid; phenylphosphoric acid; phenylphosphonic acid; phenylphosphinic acid; di-n-butylpyrophosphoric acid; di(2-ethylhexyl)pyrophosphoric acid; octylphosphoric acid; 2-methylbenzylphosphonic acid;

1-aminoethane-1,1-diphosphonic acid; 1-hydroxyethane-1,1-diphosphonic acid; 1-hydroxydecane-1,1-diphosphonic acid; 1-(N-methylamino)-ethane-1,1-diphosphonic acid; N,N-dimethylaminomethane-1,1-diphosphonic acid; N-butylaminomethane-1,1-diphosphonic acid; phosphonacetic acid; 2-phosphonopropionic acid; 3-phosphonopropionic acid; 2-phosphonobutyric acid; 4-phosphonobutyric acid; 2-hydroxy-5,5dimethyl-2-oxo-1,3,2-dioxophosphorinane; 3,9-dihydroxy2,4,8,10-tetraoxo-3,9-diphosphapiro-[5,5]undecane-3,9-dioxide; amino-tris(methylenphosphonic)acid; ethylendiaminotetra(methylenphosphonic)acid; diethylentriaminopenta(methylenphosphonic)acid, examethylendiaminotetra(methylenphosphonic)acid.

14. Self-extinguishing polymeric compositions according to claim 1 or 2 comprising:
from 90 to 40 parts by weight of the component (a)
from 9 to 35 parts by weight of component (b)
from 1 to 25 parts by weight of one or more ammonium or amine phosphates (c).

15. Self-extinguishing polymeric compositions according to claim 14, wherein the ammonium phosphates (c) have a general formula $(NH_4)_{n+2}P_nO_{3n+1}$ wherein n is an integer equal to or higher than 2.

16. Self-extinguishing polymeric compositions according to claim 14, wherein the ammonium phosphates (c) have a general formula $(NH_4PO_3)_n$ wherein n is a number comprised between 50 and 500.

17. Self-extinguishing polymeric compositions according to claim 14, wherein the ammonium or amine phosphates (c) are selected from dimethylammonium or diethylammonium phosphate; ethylenediamine phosphate; melamine ortho or pyrophosphate.

18. Self-extinguishing polymeric compositions according to claim 1 wherein the polymer (a) is selected from polymers and copolymers of olefins of the formula $R-CH=CH_2$, R is a hydrogen atom or a $C_1-C_8$ alkyl or aryl radical; acrylonitrile/butadiene/styrene terpolymers; styrene/acrylonitrile copolymers; polyurethane; polyethyleneterephthalate; polybutyleneterephthalate; polyamides.

19. Self-extinguishing polymeric compositions according to claim 18 or claim 6, wherein polymers and copolymers of olefins are selected from the group consisting of:
1) isotactic or prevailingly isotactic polypropylene;
2) HDPE, LLDPE; LDPE polyethylene;
3) crystalline copolymers of propylene with lower quantities of ethylene and/or other alpha-olefins, selected from the group consisting of butene-1, hexene-1, octene-1 and 4-methylpentene-1;
4) thermoplastic compositions comprising (A) a homopolymeric fraction of propylene and one of the copolymers mentioned at (3), and (B) a copolymeric fraction consisting of elastomeric copolymers of ethylene with an alpha-olefin, optionally containing lower quantities of a diene, wherein the alpha-olefin is preferably selected from the group consisting of propylene and butene-1;
5) elastomeric copolymers of ethylene with alpha-olefins optionally containing lower quantities of diene.

* * * * *